Nov. 15, 1932.   M. FLEISCHER   1,887,925
TEMPO INDICATING MOTION PICTURE FILM
Filed Jan. 17, 1931
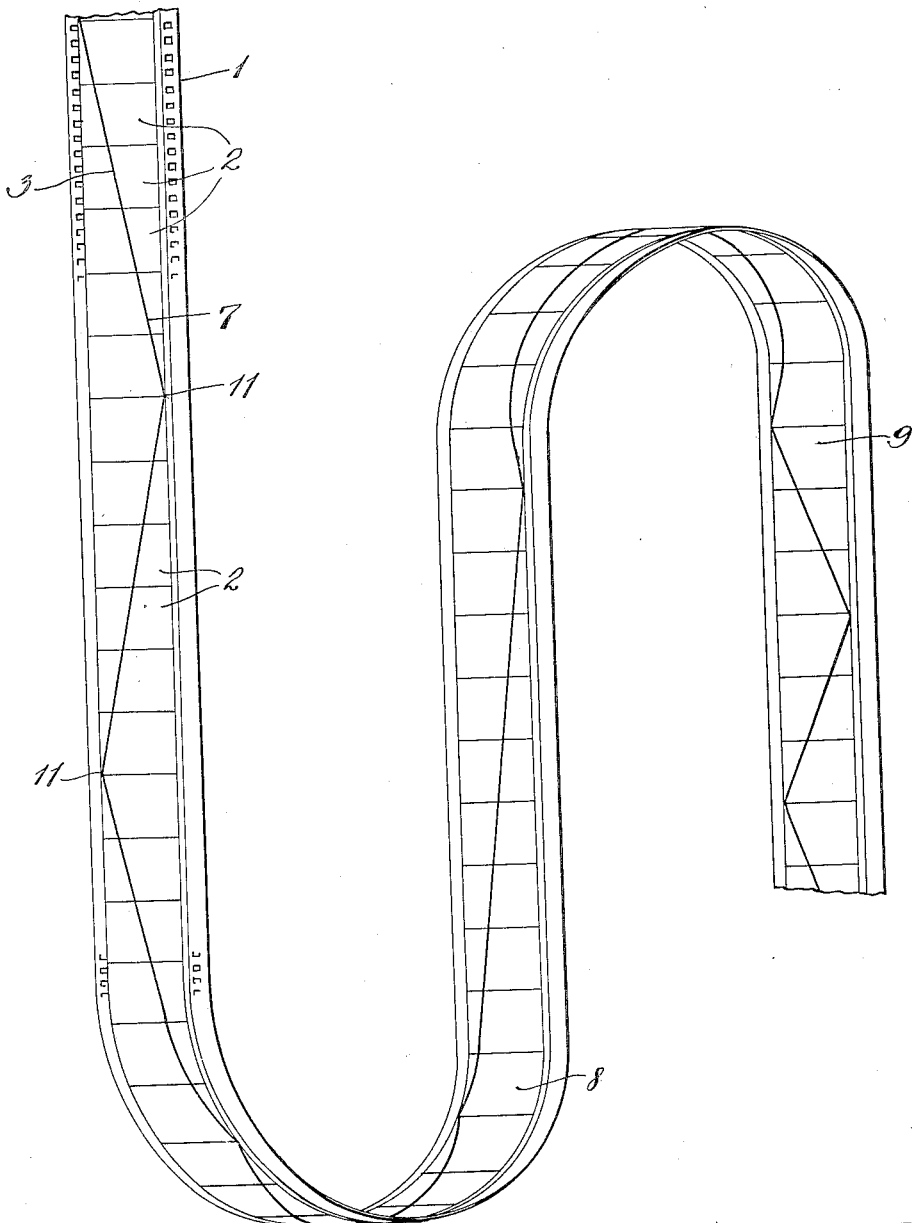
INVENTOR.
Max Fleischer
BY
Kiddle, Margeson and Homidge
ATTORNEYS.

Patented Nov. 15, 1932

1,887,925

UNITED STATES PATENT OFFICE

MAX FLEISCHER, OF BROOKLYN, NEW YORK

TEMPO INDICATING MOTION PICTURE FILM

Application filed January 17, 1931. Serial No. 509,366.

This invention relates generally to the making of sound synchronized motion pictures where the sound is recorded and synchronized subsequent to the taking of the pictures, and particularly to tempo indicating means carried by a motion picture film for securing proper synchronization of the sound with the motion pictures, especially motion pictures of animated drawings.

One of the objects of my invention is the provision of indicating marks non-photographically applied to the cinematographic print of the motion picture which serve to indicate to the performers, (an orchestra, for instance), the proper tempo at which the music should be played in order to synchronize with the pictures.

Another object of my invention is the provision of means applied to a print of a motion picture film which not only indicates the proper tempo but also indicates changes in the tempo and the nature and degree of such changes. That is, whether the change is an acceleration or a retard and the degree of such acceleration or retard.

Another object of my invention is the provision of continuous indicia applied to a print of a motion picture film for the purposes above mentioned as distinguished from intermittent indicia.

The sound employed with motion pictures of animated drawings is recorded photographically upon a sound track upon the same print which carries the pictures, or recorded upon phonograph discs which are operated synchronously with the film carrying the pictures. At the present time the photographically recorded sound is generally used.

To synchronize the sound selected to accompany the pictures, and which may consist of music, instrumental or vocal, or of dialogue, et cetera, according to present practices, a motion picture print of the picture is projected before the performers who are to furnish the sound, so that the action may be noted and the tempo of the sound accordingly regulated. After several views of the projected print, assuming that orchestral music is to be employed, the orchestra performs under the guidance of its conductor who watches the action of the projected pictures and times the music accordingly as best he may. This music is recorded and the record is later printed on the sound track of the prints which carry the pictures. This method requires many rehearsals, and at best, indifferent synchronization is secured.

In order to improve upon these results, indicating marks, usually a representation of a conductor's baton, have been photographed upon the negative of the picture film and printed over on the prints thereof, the baton appearing in different positions to indicate the beat, for instance oscillating from right to left, or moving up and down. Such baton representations have been placed within the picture area, or under it, or alongside it, each movement or beat of the baton occuring at a preselected picture frame, to which for the sake of brevity I refer as the "beat frame".

While these baton representations serve to improve synchronization, they involve the necessity of photographing the baton or other indicating device in association with the photographing of the drawings.

Furthermore none of these methods give any warning or signal of an approaching change in tempo whereby the conductor of the orchestra may be apprised of an approaching change to which he can accommodate the tempo of his music immediately.

My invention entirely eliminates the skill and expense involved in photographing indicating beat marks upon either the negative or positive film carrying the pictures.

One of the advantages of the present invention over previous methods resides in the provision of a continuous marking on the print which not only indicates the tempo of the music to be synchronized with the pictures but also indicates continuously and in advance the changes in the tempo, the nature of the change and the degree of the change, all without the necessity of photographing indicia on the print.

Briefly my improved method comprises the mechanical or manual, as distinguished from photographic, application of a continuous cue or mark to a print whereby upon projection of the print the performers will be enabled to properly synchronize the sound therewith.

Other advantages of my improved method of synchronizing sound with motion pictures over present methods will be obvious from the following description and the accompanying drawing.

In the drawing I have illustrated a print 1 made from a negative of animated drawings, the frames of which I have designated 2. In carrying out my improved method I run this print through a projecting machine or other suitable mechanism and while the same is traveling I watch the action and with a pencil or other stylus or instrument I mark a continuous line across the print from right to left and left to right in accordance with the action on the print resulting in a continuous zigzag line or mark 3 upon the print.

It will be obvious that if a pencil is used the mark will be a pencil mark whereas if a sharp instrument is used the mark will be a scratch removing the emulsion from the print.

The speed at which the instrument is drawn across the print will correspond to the tempo of the music to be synchronized therewith each stroke corresponding to a beat. The angles formed by the strokes with the edge of the print or the frame and the length of the stroke will determine the tempo of the sound. For instance, so long as the tempo of the sound remains uniform and unchanged the zigzag line 3 will be uniform, that is, the angles which the line forms will be equal and the length of the strokes will be equal. However should the tempo be changed the angles formed by the line 3 will likewise be changed. In other words if the tempo is decreased for example the stroke will be slower resulting in a line forming an angle of lesser degree, whereas if the tempo is accelerated the stroke will be faster resulting in a line forming an angle of a greater degree.

In the drawing I have illustrated a line 7 beginning in the upper left hand corner of the first frame and extending at an angle through six frames, being the result of a stroke from left to right. This and the next three succeeding strokes represent uniform tempo, that is, the tempo has not changed for twenty four frames. Now assuming the tempo is to be retarded it will be noted that the next stroke which begins at the frame marked with the numeral 8 and each succeeding stroke extends for ten frames, hence the stroke is obviously longer and the angle sharper or of lesser degree than that of the preceding strokes. Now assuming the tempo is to be accelerated beginning say at the frame marked with the numeral 9 the stroke beginning at this point, it will be noted, extends for three frames only, hence the stroke is shorter and the angle formed of a greater degree than that formed by the preceding strokes.

I do not wish to limit myself to the method of applying the marking as above outlined inasmuch as the following alternative method or other methods of applying the marking may be employed. This alternative method is as follows:

Instead of marking the line 3 on the print as the print is being projected, I may, without projecting the print, draw or rule the diagonal line 3 thereon from one beat frame 11 to another, as shown in the drawing, the beat frames having been predetermined by the tempo of the sound which is to be synchronized with the action.

When it is desired to synchronize the sound with the action of this print the print is projected upon a screen before the performers and when so projected the line will appear to travel across the picture. For instance the first frame projected will show the line 3 extending at an angle from the upper left hand corner to a point at the bottom of the frame about one-sixth the distance from the left hand side. As the next frame is projected the line will appear to have moved further to the right and as the next frame appears it would seem to have moved still further to the right. It is the speed at which this line appears to travel from one side to the other that indicates to the performers the tempo of the music. For example, a beat corresponding to line 3 is held for six frames inasmuch as it requires six frames to be projected before the line has completed its travel to the other side of the picture. This line it will be noted travels back and forth from one side to the other in the same number of frames or at the same speed indicating a uniform tempo until it reaches frame 8 where the line appears to "slow up", it now requiring ten frames before it completes its travel to the other side. It will at once be obvious to the performer that the tempo has been retarded and the degree of the retard is likewise obvious from the angle of the line or rate of travel.

Likewise when the frame 9 appears the performer will note that the stroke extends a greater distance across the frame or at a greater angle hence will be informed immediately of the acceleration of the tempo as well as the degree of acceleration.

While I have illustrated and described my method as applied to post-synchronization, that is, the synchronizing of sound after the pictures have been made. It is to be understood that my method may also be employed in synchronizing the action with the sound, that is, the sound having been first produced the action is subsequently synchronized therewith. In carrying out this latter method I employ a strip of raw film and run the same through a projection machine or other suitable mechanism at the customary speed of sound films while the sound is being produced and as the same is traveling I mark the raw film with a pencil or other stylus in the manner above described. A raw film thus marked will be provided on its surface with a zigzag line similar to the line 3 shown in the drawing indicating the beats, acceleration, retard, length of notes and other sounds which may occur or are required for the purposes hereinbefore described. By this method the markings will indicate to the artist, animator or trick photographer the number of frames required for the action corresponding to the sound.

It is to be understood also that where I refer to music in the description of my invention this word is to include or cover sounds of any kind that it may be desired to record.

What I claim is:

1. A motion picture film having zigzag indicia on the face thereof and intercepting a predetermined number of frames thereon for indicating changes in the tempo of sound to be synchronized with the action of the film, and the character of such changes.

2. A motion picture film having a continuous zigzag line intercepting a plurality of frames of said film to indicate the tempo of sound to be synchronized therewith.

3. A motion picture film having a continuous line thereon zigzagging from side to side thereof and intercepting a plurality of frames of said film for indicating the tempo of sound to be synchronized therewith.

4. A motion picture film having a continuous zigzag index thereon intercepting predetermined frames and a predetermined number of frames thereof for indicating the tempo, changes in the tempo and the character and degree of the changes in the tempo of the sound to be synchronized therewith.

This specification signed this 16th day of January, 1931.

MAX FLEISCHER.